United States Patent
Schiemann

(10) Patent No.: US 8,990,797 B2
(45) Date of Patent: Mar. 24, 2015

(54) METHOD FOR IMPROVING THE PERFORMANCE OF COMPUTERS BY RELEASING COMPUTER RESOURCES

(75) Inventor: Tibor Schiemann, Darmstadt (DE)

(73) Assignee: AVG Netherlands B.V., Amsterdam (NL)

( * ) Notice: Subject to any disclaimer, the term of this patent is extended or adjusted under 35 U.S.C. 154(b) by 549 days.

(21) Appl. No.: 12/913,858

(22) Filed: Oct. 28, 2010

(65) Prior Publication Data

US 2011/0321034 A1 Dec. 29, 2011

(30) Foreign Application Priority Data

Jun. 25, 2010 (EP) .................................... 10167361

(51) Int. Cl.
*G06F 9/445* (2006.01)
*G06F 9/44* (2006.01)
*G06F 11/34* (2006.01)

(52) U.S. Cl.
CPC .......... *G06F 9/4406* (2013.01); *G06F 11/3409* (2013.01)
USPC .......................................... 717/174; 718/100

(58) Field of Classification Search
None
See application file for complete search history.

(56) References Cited

U.S. PATENT DOCUMENTS

| | | | | |
|---|---|---|---|---|
| 5,859,978 | A * | 1/1999 | Sonderegger et al. | 709/226 |
| 6,910,210 | B1 * | 6/2005 | Chew | 718/103 |
| 7,447,923 | B2 * | 11/2008 | Bose et al. | 713/300 |
| 7,503,044 | B2 * | 3/2009 | Chew | 718/103 |
| 7,716,301 | B2 * | 5/2010 | Yoshizawa et al. | 709/217 |
| 7,725,898 | B2 * | 5/2010 | Chew | 718/103 |
| 8,095,930 | B2 * | 1/2012 | Chew | 718/103 |
| 2002/0166046 | A1 * | 11/2002 | Bidarahalli et al. | 713/2 |
| 2005/0034129 | A1 * | 2/2005 | Chew | 718/100 |
| 2005/0138448 | A1 * | 6/2005 | Chew | 713/300 |
| 2005/0177832 | A1 * | 8/2005 | Chew | 718/104 |
| 2005/0266112 | A1 | 12/2005 | Che | |
| 2005/0268112 | A1 * | 12/2005 | Wang et al. | 713/188 |
| 2007/0043960 | A1 * | 2/2007 | Bose et al. | 713/300 |
| 2008/0209557 | A1 | 8/2008 | Herley | |
| 2009/0144584 | A1 * | 6/2009 | Rowles et al. | 714/25 |

FOREIGN PATENT DOCUMENTS

WO WO 2005084051 A1 * 9/2005 ............... H04Q 7/32

OTHER PUBLICATIONS

Anonymous: Ashamppo Startup Tuner 2.00; Jun. 6, 2007; pp. 1-2; found on Nov. 15, 2010 (European Search Report of counterpart application) at URL:http://www.softpedia.com/get/Tweak/System-Tweak/Ashampoo-Startup-Tuner.shtml—XP002609498.
Anonymous: Ashamppo Startup Tuner 2; Jun. 5, 2007; pp. 1-3; found on Nov. 15, 2010 (European Search Report of counterpart application) at URL:http://www.ashampoo.com/frontend_images/1/products/0117/en/ startup_tuner_2_en_AUD.pdf—XP002609499.
Anonymous: How to identify programs that slows down your computer during startup; Jul. 9, 2007; pp. 1-4; found on Nov. 15, 2010 (European Search Report of counterpart application) at URL:http://www.watchingthenet.com/how_to_identify_programs_that_slows_down_your_computer_during_startup.htm—XP002609500.
Anonymous: Editor's Review—Ashampoo Startup Tuner 2; Jun. 6, 2007; pp. 1-2; found on Nov. 15, 2010 (European Search Report of counterpart application) at URL:http://www.soft32.com/download_203933.html—XP002609501.

* cited by examiner

*Primary Examiner* — Lewis A Bullock, Jr.
*Assistant Examiner* — Christine Dang
(74) *Attorney, Agent, or Firm* — Kramer Levin Naftalis & Frankel LLP

(57) ABSTRACT

In a method for improving the performance of a computer system by releasing computer resources, a list P of programs installed on a computer system is determined. All relevant extension points EP of the computer system are searched for registered entries. A list A of automatically starting programs is generated by assigning the registered entries at the relevant extension points EP to the installed programs, respectively. The list A of the automatically starting programs is compared with a list S of system-required programs and a list V of used programs. Programs that are not system-required and programs that have not been used for a longer period of time are deactivated and computer resources that have been used by the deactivated programs are released. The deactivation of programs can be done by the user or automatically and can be cancelled when necessary.

23 Claims, No Drawings

METHOD FOR IMPROVING THE PERFORMANCE OF COMPUTERS BY RELEASING COMPUTER RESOURCES

BACKGROUND OF THE INVENTION

The invention concerns a method for improving the performance of a computer system, in which method resources, such as the main memory or processing time, are released by automatic or user-initiated deactivation of automatically started programs or program parts or programs or program parts running in the background that are however not system-relevant or currently not utilized. These resources are then available for the programs or program parts that are actually being used.

In the following, performance is to be understood as the overall computing or processing power of a computer system. The user notices the processing power in particular by the speed at which programs and updates of the operating state are processed, like start-up, shut down, restart, and hibernation.

The processing performance of a computer is limited and depends on the hardware (e.g., the processing speed of the processor, the size and speed of the physical main memory and the read/write rate of the hard disk). The available processing performance of the hardware must be shared between all programs running on the computer—a job which is called "multitasking" and is carried out by modern operating systems like Microsoft VVindows®. The more programs share in the processing power at the same time, the smaller the proportion of the processing power that is available to each individual program and the longer the response time of the computer for reacting to inputs in a certain program and for processing commands.

If the programs installed on a computer could share the processing power only when the user starts and actually uses these programs, the number of installed programs would have no effect on the speed of a computer. However, in reality it has been found that there is a relationship between the number of installed programs and the speed at which a computer responds and works.

The reason for this is that operating systems like Microsoft Windows® enable programs to link up at certain extension points EP with the processes of the operating system. Many programs register themselves during their installation at one or several of these extension points EP in order to be started automatically by the operating system when certain events occur without the user having to start them manually ("autostart"). The parts of a program automatically started in this manner often continue to run in the background in order to make available certain functionalities to the user or the program ("background functionalities").

As a result of this, programs that have registered themselves for autostart with one or several extension points EP use up the limited processing resources of the computer without any user action (and often without the user even knowing).

In this connection, the following relationships are to be observed:

a) The more programs have registered themselves for an autostart during the system start, the longer the system start will take.

b) The more background functionalities are running during operation on the computer system, the less computing power is available to the user and his currently used programs.

c) The more background functionalities are running at the time when the user gives the command for shutting down the computer, the longer the shutdown will take because the still running background functionalities must be terminated before shutdown.

d) The more background functionalities are running at the time when the user gives the command for hibernation mode, the longer it takes to enter into the hibernation mode, because the operating state of the running background functionalities must be transferred from the main memory onto the hard disk.

e) The more background functionalities had been active at the time when the computer system was switched to hibernation mode, the longer it will take to return the operating state of the system state from the hard disk to the main memory.

Many computers are already delivered by the manufacturer with a huge number of pre-installed programs ("OEM software"; OEM=original equipment manufacturer) which means generally that already at the time of delivery numerous autostarts are registered and numerous background functionalities are operative. From the start, the processing power of these computers is already taxed correspondingly more strongly and the buyer cannot use the full computing power of his hardware.

Moreover, most users over time install additional programs on their computer which results, in turn, in the performance resources being additionally stressed, when these programs register autostarts and provide background functionalities. Users that have little technical experience are therefore under the impression that the performance of their computer decreases more and more over time.

In the past, these problems have been solved in different ways. Often, new hardware was purchased because the user assumed that hardware performance of the existing system was insufficient. Regularly, the operating system was installed anew and some of the programs preinstalled by the hardware manufacturer were eliminated so that an acceleration of the system was achieved. A further possibility resides in uninstalling programs that are not required. This is done advantageously by using uninstall routines provided by the operating system and the program manufacturers (for Windows®: menu icon "software", "add or remove programs" or "programs and functions"—depending on the version of Windows® in the control panel). Uninstall software is also used at times, like the TuneUp Uninstall Manager, Revo Uninstaller or similar solutions. Advanced users manually switch off individual entries registered at the extension points EP, for example, by means of the system configuration program ("msconfig"), the menu icon "Services" in the control panel or the menu item "Scheduled Tasks" or "Task Scheduler" (depending on the version of Windows®) in the control panel of Microsoft Windows®. Tools like "Sysinternals® Autoruns" or "Windows® Defender" can be used also for this purpose. Some commercial software tools permit to disable software entries at the extension points EP that are not required by most users and that are listed on a list of known entries. This is done, for example, by the software "TuneUp Optimize System Startup and Shutdown".

A disadvantage of most of the aforementioned solutions is that intervention by a user is necessary. Inexperienced users can make the system unstable or inoperative when activating faulty settings.

It is an object of the present invention to free up system resources of a computer system operating under the operating system Windows® (version XP and newer ones) and to improve thus the performance perceived by the user, in that programs that the user does not need in the actual operating state are deactivated and reactivated when needed.

SUMMARY OF THE INVENTION

According to the invention, this object is solved with a method for improving the performance of computers by release of computer resources that comprises the following steps:
 a) determining a list P of the programs installed on the computer system;
 b) searching all relevant extension points EP of the computer system for registered entries;
 c) generating a list A of automatically starting programs by assigning the registered entries at the relevant extension points EP to the installed programs, respectively;
 d) comparing the list A of the automatically starting programs with a list S of system-required programs and a list V of used programs;
 e) deactivating programs that are not system-required for the computer and have not been used for a longer period of time and releasing the computer resources that have been used by the deactivated programs.

Preferred embodiments of the method are disclosed in the dependent claims and explained in more detail in the following.

DESCRIPTION OF PREFERRED EMBODIMENTS

The term "deactivation" of a program means that all background functionalities of this program are terminated and subsequently all entries associated with this program at the extension points EP are removed or changed in such a way that they are no longer attended to by the operating system.

The "reactivation" of a program means that the initial state of all entries associated with this program at the extension points EP is restored in such a way as if it had never been deactivated and all necessary background functionalities are restarted.

When in the following it is described that lists are compiled or determined or comparisons are carried out or similar processing steps are named, this implies that the results (also partial results) of these steps are saved or are made available in other ways for subsequent processing.

In the method step a) according to the invention, advantageously the list of installed programs that is provided by the Windows® operating system is used for determining the list P of all programs installed on the computer system. Alternatively, or in addition, acquisition of the installed programs is also possible with the aid of the uninstall information that is contained in Windows® system directories.

In the method step b) according to the invention, the search at all relevant extension points EP of the system for entries registered thereat preferably encompasses the autostart section of the Windows® registry, the autostart folder in the start menu, the Windows® services, and the function "Scheduled Tasks" of the control panel. Not only the entries are acquired that are processed during booting up, but also the entries that are processed during the run time of the system (e.g., event-controlled or time-controlled entries). A list of the relevant extension points EP is made available to the method and selected on the basis of the currently found Windows® version.

In the method step c) according to the invention, the combination of both sources of information occurs by means of assigning the entries found at the extension points EP to the respective installed programs of the list P, preferably by querying the local Windows® installer database, the readout of the uninstall keys of the Windows® registry and/or the examination of the version information blocks of all relevant executable files according to product name and manufacturers name. As a result a list A of automatically starting programs is produced. The automatically starting programs can be programs that start event-controlled and/or time-controlled.

In the method step d) according to the invention, the identification of programs that are necessary for the proper and safe function of the system, e.g., security programs, programs required for the use of the hardware (drivers) etc., is carried out by means of a list S in which known programs of this category are listed. This list S is made available to the method within its technical program realization. In addition, dependency information is extracted from the system and the corresponding programs are added to the list S. Such information is found, for example, in the information of installed services in which it is also noted which further services depend on a certain service or from which other services said certain service, in turn, depends.

Moreover, advantageously an identification of programs that have been used within a certain number of days of use of the computer is also realized. They are entered advantageously in the list V and are protected against an unintentional deactivation. In turn, programs that have not been used for a longer period of time (certain number of days) are recognized. The definition from which point on a program is considered "used" is derived preferably based on whether the program appeared on the monitor for a significant portion of the time during which the user used the computer system— and/or—whether at least one relevant interaction by the user with the program occurred (e.g., input of the user in the program with the keyboard or the mouse). Another criterion can be the interaction of a program with other programs. The default setting in regard to from which duration of utilization on a program is to be considered "used" can be advantageously set by the user.

In the method step e) according to the invention, it is now possible that the user carries out a "deactivation" or "reactivation" of an installed program in order to be able to control the performance loss of the system caused by the program without having to uninstall it. It is also possible to have the method perform "deactivation" or "reactivation" (in the context disclosed above) of an installed program automatically by an appropriate default setting.

In a preferred embodiment, a visualization of the effects on the system performance that would result upon deactivation of the individual programs registered at the extension points EP is provided. In this connection, advantageously the effects on the system start, on the running system, and on the shutdown are taken into account.

These effects can be displayed cumulatively as well as individually for each program to make the advantages of the deactivation of programs visible and easy to understand. In addition, optionally a grouping to a logical set is realized for the program collections that generate several entries in the list of the installed programs during installation.

Advantageously, an automatic reactivation of a deactivated program occurs when the user tries to execute it in order to avoid that self-repair routines or error messages are triggered. For example, an error message could appear otherwise if a necessary service has been deactivated or cannot be found.

In a preferred embodiment, the automatic reactivation of a deactivated program occurs when the user tries to uninstall it so that in this way errors during uninstall are avoided or errors in deleting files of the program (undeleted files remain) are avoided.

In a preferred embodiment, an automatic reactivation of the program occurs when a program functionality is addressed at an extension point EP, i.e., a request is addressed to the program. For this purpose, the extension points EP are monitored to detect the requests addressed to the deactivated programs. This is done advantageously in that routines are registered at the extension points EP under the name of the original entries of the programs, which routines carry out a reactivation of the deactivated programs, and cache in the interim parameters that are to be passed on and transmit the parameters to the program after reactivation has occurred.

In a preferred embodiment an execution of the inventive method occurs automatically without intervention by the user. Thus, the system can be maintained permanently at optimum performance without manual intervention by the user.

Advantageously, for this purpose the performance of the computer system for the period of utilization is determined regularly and when a drop in performance by a certain amount is detected, the execution of the method is automatically triggered. A performance drop of approx. 10% is generally considered to be recognizable by the user. Therefore, the method is executed preferably when a performance reduction around this value is observed.

Optionally, the user is offered the option of defining an exclusion list of programs that should never be deactivated. Advantageously, all programs that are necessary for the proper and safe function of the computer system are already included here and are excluded from deactivation.

Advantageously a regular and/or automatic check occurs also in regard to whether all of the following criteria are fulfilled for one or several of the installed programs:
  i. The program has not been used for a longer period of time (certain number of days) of PC utilization.
  ii. The program is not required for the proper and safe function of the computer system.
  iii. The program is not on the optional user-defined list of programs that should never be deactivated.

An automatic deactivation of all programs where these criteria apply is then carried out. In a preferred embodiment the user is notified about this action. Advantageously, the indication which programs are to be deactivated or to be reactivated is coupled to the user profile so that different user behaviors or different working tasks of different users are taken into consideration.

Advantageously, the program that executes the inventive method is loaded, preferably automatically, at system startup and is executed and remains active at least in the background up to shutdown of the computer system, i.e., is running during the entire operating period of the computer system. Interactions with the user can be initiated on request by the user, on the basis of system events (for example, inquiry whether a program should be deactivated or be reactivated) or based on time-controlled actions (for example, regular system maintenance).

By means of the inventive method the whole system performance of a computer system remains at a high level for a long period of time. The processing speed of the system is higher. By the release of the main memory space that otherwise would be occupied by background programs it is possible to make available more memory to the actually used programs. Because of the fact that the programs are not loaded, no central processor time is assigned to these programs by the central processor time distribution service (scheduler) and this leads to a quicker execution of the actually used programs. Upgrading or replacement of the hardware components can at least be delayed for some time. The user is not forced to uninstall programs as soon as they are no longer immediately needed. The problems otherwise caused by this, as, for example, incomplete uninstall or unintentional uninstall of still required programs, are avoided in this way. Also, new installation of the operating system can become obsolete in this way. By automatic selection of programs suitable for deactivation the user must not decide himself which entries that are present at different extension points EP are to be deactivated or deleted. Less experienced users can thus also optimize the performance of their computer system. By monitoring the entries at the extension points EP and the automatic reactivation of the entries, the user is not bothered with error messages on account of disabled entries. Especially advantageous is the adaptive character of the method that resides in that the programs not needed by a certain user are deactivated. Advantageously, this information is linked with the user profile of the system so that, depending on the user, the appropriate set of programs is deactivated or activated. Advantageously, deactivations of automatically starting programs whose architecture does permit this become immediately effective. The resources used by these programs are released immediately without requiring a restart of the entire system.

The specification incorporates by reference the entire disclosure of European patent application 10 167 361.4 having a filing date of Jun. 25, 2010 whose priority is being claimed.

While specific embodiments of the invention have been shown and described in detail to illustrate the inventive principles, it will be understood that the invention may be embodied otherwise without departing from such principles.

What is claimed is:

1. A computer-implemented method for improving the performance of a computer system by releasing computer resources, the method comprising:
  determining that a reduction in performance of the computer system exceeds a defined threshold;
  determining a list of programs installed on the computer system;
  using a data processing device associated with the computer system;
    searching all relevant extension points of the computer system for registered entries; and
    assigning the registered entries at the relevant extension points to the installed programs, respectively, to generate a list of automatically starting programs;
  comparing the list of the automatically starting programs with a list of system-required programs and a list of used programs; and
  using the data processing device and, in response to the determining that the reduction in performance of the computer system exceeds the defined threshold:
    deactivating ones of the installed programs that are not system-required and ones of the installed programs that have not been used for a preselected period of time;
    releasing resources of the computer system that had been used by the deactivated ones of the installed programs; and
    in response to at least one of: (i) an attempt to execute a deactivated one of the installed programs; (ii) an attempt to uninstall a deactivated one of the installed programs; and (iii) receiving a request addressed to a deactivated one of the installed programs, reactivating the deactivated one of the installed programs by restoring initial states of entries at the relevant extension points associated with the deactivated one of the installed programs as if the deactivated one of the installed programs had never been deactivated.

2. The computer-implemented method according to claim 1, wherein determining the list of the installed programs is based on at least one of:
 querying an operating system installed on the computer system; and
 uninstall information.

3. The computer-implemented method according to claim 1, wherein the relevant extension points comprise at least one of:
 an auto start section of a Windows® registry;
 auto start folders in a start menu;
 Windows® services; and
 a scheduled tasks function of the control panel.

4. The computer-implemented method according to claim 1, wherein assigning the registered entries is effected based on at least one of:
 querying local Windows® installer databases;
 a readout of uninstall keys of a Windows® registry; and
 querying version information blocks of all relevant executable files according to product name and manufacturer name.

5. The computer-implemented method according to claim 1, wherein the list of system-required programs is at least one of:
 a default setting; and
 dependency information of the computer system.

6. The computer-implemented method according to claim 1, wherein deactivating ones of the installed programs is initiated one of by a user and automatically.

7. The computer-implemented method according to claim 6, further comprising the step of providing visualized information to the user representing at least one effect of deactivating ones of the installed programs.

8. The computer-implemented method according to claim 1, further comprising the step of monitoring the relevant extension points of a deactivated one of the installed programs to detect requests addressed to the deactivated one of the installed programs.

9. The computer-implemented method according to claim 8, wherein the reactivating of the ones of the deactivated programs occurs automatically when a request addressed to the deactivated one of the installed programs is detected.

10. The computer-implemented method according to claim 9, wherein the reactivating of the ones of the deactivated programs occurs before performing an uninstall function.

11. The computer-implemented method according to claim 9, further comprising the step of caching parameters to be passed to the deactivated ones of the installed programs until the step of reactivation is performed.

12. The computer-implemented method according to claim 1, wherein deactivating ones of the installed programs is effected when:
 the installed programs have not been utilized for a preselected time period;
 the program is not required for a proper and safe function of the computer system; and
 the program is not on a list, defined by the user, of programs not to be deactivated.

13. The computer-implemented method according to claim 1, further comprising the step of running an execution program that executes the method during an entire operating period of the computer system.

14. The computer-implemented method according to claim 13, wherein the execution program is loaded automatically when starting up the computer system and is automatically terminated when shutting down the computer system.

15. The computer-implemented method according to claim 1, wherein the deactivating comprises:
 terminating background functionalities of ones of the installed programs; and
 at least one of removing and changing entries associated with the ones of the installed programs at the relevant extension points such that the entries are no longer attended to by an operating system installed on the computer system.

16. A system for improving the performance of a computer system, the system comprising a data processing device configured to:
 determine a list of programs installed on the computer system;
 search all relevant extension points of the computer system for registered entries;
 assign the registered entries at the relevant extension points to the installed programs, respectively, to generate a list of automatically starting programs;
 compare the list of the automatically starting programs with a list of system-required programs;
 deactivate ones of the installed programs that are not system-required and that have not been used for a determined period of time; and
 in response to at least one of: (i) an attempt to execute a deactivated one of the installed programs; (ii) an attempt to uninstall a deactivated one of the installed programs; and (iii) receiving a request addressed to a deactivated one of the installed programs, reactivate the deactivated one of the installed programs by restoring initial states of entries at the relevant extension points associated with the deactivated one of the installed programs as if the deactivated one of the installed programs had never been deactivated.

17. The system according to claim 16, wherein the data processing device is configured to:
 monitor the extension points of a deactivated one of the installed programs to detect requests addressed to the deactivated one of the installed programs.

18. The system according to claim 17, wherein the reactivating of the ones of the deactivated programs occurs automatically when a request addressed to the deactivated one of the installed programs is detected.

19. The system according to claim 17, wherein the reactivating of the deactivated one of the installed programs occurs before performing an uninstall function.

20. The system according to claim 16, wherein the data processing device is configured to:
 cache parameters to be passed to the deactivated one of the installed programs until the reactivating is performed.

21. The system according to claim 16, wherein, when deactivating ones of the installed programs, the data processing device is configured to:
 terminate background functionalities of the ones of the installed programs; and
 at least one of remove and change entries associated with the ones of the installed programs at the extension points such that the entries are no longer attended to by an operating system installed on the computer system.

22. The system according to claim 16, wherein the data processing device is configured to:
 determine that a reduction in performance of the computer system exceeds a defined threshold before deactivating ones of the installed programs.

23. The system according to claim 22, wherein the data processing device is configured to:
   release resources of the computer system that had been used by the deactivated ones of the installed programs.

* * * * *